Patented July 5, 1938

2,123,092

UNITED STATES PATENT OFFICE 2,123,092

FILTER TREATMENT

Abraham Sidney Behrman, Chicago, Ill., assignor, by mesne assignments, to Infilco Inc., a corporation of Delaware No Drawing. Application August 13, 1936, Serial No. 95,849

13 Claims. (Cl. 210—62)

The present invention relates to the treatment of filter beds composed of granular activated carbon and has particular reference to an improved method for purifying or sterilizing such beds. This application is a continuation in part of my copending application Serial No. 450,060, filed May 5, 1930.

A popular method in the treatment of water consists in passing the water through a fixed bed or "filter" of granular activated carbon, this method being of particular utility in the food and beverage industries in which it is desirable to remove from the water objectionable tastes and odors. These tastes and odors may arise from sources such as vegetation with which the water has come in contact, industrial wastes, and decomposition products of the metabolism of minute organisms. In conjunction with the chlorination or super-chlorination of water activated carbon purifiers are employed also for sterilization of the water and for removal of iron, color and certain other impurities.

The adsorption of organic matter and bacteria by the carbon may result in bacterial growths in and contamination of the carbon bed, so that the bacteria count in the effluent water actually may be greater than in the influent. The presence of bacteria in the bed is unsanitary and objectionable from many standpoints such as the possibility of contributing to the spoilage of food and beverage products.

The principal object of the present invention is to provide an effective and desirable method for sterilizing carbon beds of the type described.

An additional object is to provide a process for sterilizing granular carbon beds, wherein iodine is put in water solution and then passed in contact with the bed to be sterilized, the carbon acting to adsorb the iodine from the solution in such a manner as to effectively rid the bed of undesirable organisms.

Still another object is to provide a process wherein a granular carbon bed is sterilized by treatment with a water solution of iodine in such a manner that the iodine is distributed throughout the carbon bed and adsorbed by the carbon.

These and other objects will be evident upon a consideration of the following specification.

Carbon purifiers for water treatment generally include a mechanism somewhat similar in structure to the structure of a conventional sand filter. Such purifiers comprise a suitable container holding a bed of granular activated carbon of a screen size which may be between 4 and 12 mesh, the container being supported on several layers of graded gravel disposed over an adequate distributor system which includes means for permitting the passage of water through the carbon in upward or downward direction as may be desired by the conditions of purification or backwashing. Where a metal container is employed, the interior surface of the container and any metal parts therein are coated with a dielectric material in order to prevent galvanic action between the metal and the carbon. The depth of the granular carbon bed in industrial water purification units generally is not less than 20 to 24 inches. Occasionally, this depth may reach 3 or 4 feet, or even more. Rate of flow of water through the carbon bed usually is about 2 gallons per minute per square foot of bed area based on the depth of 20 to 24 inches of carbon. Where deeper beds are employed the flow may be increased proportionately.

Due to the tremendous porosity of activated carbon and to its great adsorptive capacity for many types of organic matter, it is not desirable to pass water through a bed of carbon unless the water is free from suspended matter and bacteria. That is, the principal use of activated carbon purifiers is on filtered water, preferably containing a little free chlorine. However, in many cases it is not feasible to employ chlorine in the water.

The carbon bed will pick up from the influent water suspended matter of an organic nature and including bacteria. This adsorption of organic matter and bacteria may tend to encourage bacterial growths in the carbon bed, thereby contaminating the latter so that the bacterial count in the effluent water actually may be greater than in the influent. Also the bacterial growth may decrease the efficiency of the filter.

Heretofore efforts have been made to provide a sterilizing process for carbon beds. These efforts have included the use of steam and chemical methods of sterilization such as the use of a strong solution of caustic soda. Both of these methods are awkward and hazardous. The steam generally is not available and is applied only with difficulty. The strong solution of caustic soda is washed out with great difficulty due to the tenacity with which the caustic soda is retained by the carbon. Efforts also have been made to employ solutions of chlorine, hypochlorite, and even chloramine, but the use of these substances is unsatisfactory due at least in part to the extremely rapid chemical reaction which occurs between the chlorine and the carbon and the consequent loss of active chlorine.

In accordance with the present invention the carbon bed is sterilized by placing iodine in water solution and contacting the solution with the carbon bed in such a manner that the carbon to be sterilized is placed in adsorptive relation with respect to the iodine solution. On the standpoints of simplicity, effectiveness and economy this method of sterilization is greatly superior to any of the methods which have been tried heretofore. While the other halogens are chemically acted upon by carbon in water solution, iodine is adsorbed by the carbon to a remarkable extent without chemical reaction therewith. Some grades of activated carbon will adsorb 25 or 30 per cent of their own weight of iodine and this iodine will be retained tenaciously unless displaced by special treatment such as with alkalies or with reducing agents. In this connection, the iodine when in adsorbed relation with respect to the carbon acts as an oxidizing agent and has a specific sterilizing action upon micro-organisms of the bed. In sterilizing the bed it is not necessary that an amount of iodine sufficient to saturate the carbon be employed. A relatively small quantity of iodine, based on the weight of the carbon, is sufficient.

The carbon bed may be treated with the iodine in several ways. A water solution of iodine may be passed through the carbon bed. Due to the adsorptive capacity of the carbon for iodine, this method may result in the adsorption by the carbon with which the solution first comes in contact of a greater quantity of iodine than the carbon positioned at more remote points, a short time interval being sufficient for the carbon initially contacted to adsorb a substantial quantity of iodine in the solution.

The carbon bed also may be contacted with a neutral or alkaline iodide-iodate solution such as a solution of potassium iodide and potassium iodate, the carbon bed then being contacted with a solution of a strong acid such as sulfuric or hydrochloric to liberate iodine in the pores of the carbon, the reaction being in accordance with the following equation:

$$5KI + KIO_3 + 3H_2SO_4 = 3K_2SO_4 + 3H_2O + 3I_2$$

The carbon itself apparently has the property of liberating and adsorbing iodine from the solution of the iodide and iodate, even in the absence of an acid, since a sample of the effluent of an iodide-iodate solution passed through the carbon bed shows considerably less iodine than the influent when the two solutions are acidified. The addition of an alkali such as sodium hydroxide or sodium carbonate to the iodide-iodate solution tends to restrain this adsorption by the carbon.

A preferred method of sterilizing the carbon bed with iodine in accordance with the present invention includes the treatment of the bed with a solution of iodine in a soluble iodide solution such as potassium iodide. The use of the soluble iodide solution makes it possible to prepare a concentrated and stable solution of iodine which may be kept indefinitely and diluted when required. Also, I have found that by the use of a proper concentration of soluble iodide the adsorptive capacity of the carbon for the iodine is restrained, apparently by the tendency of the iodide to remove the iodine from the carbon. Thus, when the solution is passed through a bed of carbon there will be an ample amount of iodine left in the solution when the remote parts of the bed are reached. Usually the solution will be passed through the carbon bed in a downward direction. If all of the iodine were extracted by the upper portion of the bed there would be no iodine left for sterilizing the lower portion of the bed, this lower portion being most likely to need sterilization. It is preferred to employ a solution of such concentration and proportions of iodine and iodide that an appreciable proportion of the iodine is adsorbed by the carbon during the passage of the solution through the bed, both for reasons of economy and because in this way the maximum amount of iodine will be adsorbed by the carbon and a minimum wasted in solution in the void spaces between the carbon granules. While there is considerable latitude in the ratio of iodide to iodine which may be employed satisfactorily for the purpose described, I have used successfully a ratio of about 10 parts of iodide (as potassium iodide) to 1 part of iodine. Preferably, this ratio does not exceed 100 parts of iodide to 1 part of iodine.

In order to compensate for the lessened restraining effect of smaller proportions of iodide, I have found it advantageous to accelerate the passage of the solution through the carbon bed so as to insure at least a small amount of free iodine in the last effluent from the bed. Thus, for example, in sterilizing a 20 inch deep bed of 4 to 12 mesh activated carbon by downward flow of a solution containing 100 p. p. m. of iodine and 1000 p. p. m. of potassium iodide, and employing about 4 gallons of this solution per cubic foot of the carbon, I have found that if the downward rate of flow of the solution is adjusted so as to permit the last of the solution to descend just to the top of the carbon bed in about 1 minute or less, the effluent solution at this point will show definitely the presence of free iodine, but in much smaller amount than was present in the influent—much less than could be accounted for simply by dilution of the influent solution by the water initially present in the carbon.

For carbon beds of different depths it is obvious that the permissible rates of flow of the sterilizing solution may vary considerably to insure the proper amount of free iodine in the effluent.

As an example of the preferred form of the sterilizing procedure attention is directed to the following example of the method as employed in several commercial installations with complete success. The filter to be sterilized consisted of an activated carbon unit 24 inches in diameter, with a bed of 4 to 12 mesh activated carbon 20 inches in depth, and with a freeboard space of about 12 inches from the top of the carbon bed to the funnel or other outlet for wash water at the top of the purifier tank. The carbon bed first is thoroughly backwashed to remove suspended matter and to loosen the bed. After the backwashing operation, which leaves the freeboard space filled with water, the water level is dropped to about 11 inches from the top of the carbon bed. To the water about the bed is added 1 pint of a solution containing 8.23 grams of iodine and 82.3 grams of potassium iodide, the whole being stirred to insure distribution. The solution thus made contains about 100 p. p. m. of iodine and 1000 p. p. m. of potassium iodide, the volume of solution being slightly more than sufficient to fill the void spaces between the carbon granules, based on a 45 to 50 per cent void space in the bed. Now, by quickly opening a suitable drain valve wide, the surface of the solution is dropped just to the top of the carbon bed, the descent of the solution preferably taking place in about 1 minute or less. The remaining solution is allowed to remain in contact with the carbon long enough to insure thorough sterilizing action. This length of time is preferably at least 2 or 3 hours, and is most conveniently over night. After this period of standing, the container is filled slowly with water to the normal operating height, whereupon the unit is started washing downflow or "filtering to waste" and the washing continued until the effluent is clear and free from iodine and iodide as determined either by appropriate chemical test or simply by the absence of a medicinal or salty taste. This washing operation requires only a short time, usually not more than about 30 minutes, after which the unit may be returned to service.

From this description the simplicity and economy of my new method of sterilization will be readily apparent; and the efficacy of the method has been fully proven by field performance. In one case of a contaminated carbon bed, where the effluent had a bacteria count of between 200 and 300 per cubic centimeter in spite of an influent count of only about 25 per cubic centimeter, sterilization of the carbon bed by the method just described resulted in bacteria counts in the effluent of zero to 3 per cubic centimeter; and, in another instance, where due to very poor pre-treatment the influent bacteria counts were as high as several thousand per cubic centimeter, sterilization of the carbon bed by the process of my invention reduced the effluent bacteria counts practically to zero.

In addition to the effective sterilization of the carbon bed at the time of treatment provided by my process, the bed itself is kept in a sterile condition temporarily at least, in spite of the influx of more bacteria in the influent water. The great simplicity and effectiveness of this method of sterilizing a carbon bed thus makes it practical to use such carbon installations for service not hitherto susceptible to carbon treatment.

The iodine treatment results in a cleaner filter of increased efficiency and has thorough and complete sterilizing action upon bacterial growths contained in the pores of the carbon. As the iodine is held in adsorbed relation the sterilizing agent is complete in its penetration of the carrier for the bacterial growth and there is provided a time element for the sterilizing action which is independent of subsequent washing operations. Thus, even though the sterilizing solution is rapidly passed through the carbon at a rate which would prevent substantial action by unadsorbed sterilizing agents, the iodine is adsorbed by the carbon and sufficient time is provided for thorough and complete action. After completion of the sterilizing action and removal of any carrier solution such as a solution of potassium iodide with which the iodine may be incorporated the subsequent treatment of water containing bacteria results in the adsorption of the bacteria by the carbon and the destruction of the bacterial life by the iodine contained in the carbon.

It will be recognized that many changes may be made in the process as described herein for purposes of explanation without departing from the scope of the invention and such changes and modifications are intended to be included in the appended claims.

I claim:

1. A method for sterilizing a bed of granular activated carbon which comprises treating the bed with a solution containing a soluble iodide and iodate.

2. A method for sterilizing a bed of granular activated carbon which comprises treating the bed with a solution containing a soluble iodide and iodate and then with a solution of a strong acid.

3. A method for sterilizing a bed of granular activated carbon which comprises treating the bed with an aqueous solution of iodine and an iodide.

4. A process according to claim 3 in which the ratio of iodide as potassium iodide to iodine is about 10 to 1.

5. A method according to claim 3 in which the ratio of iodide as potassium iodide to iodine does not exceed 100 to 1.

6. A process according to claim 3 in which the ratio of iodide to iodine is such that part but not all of the iodine is adsorbed by the carbon.

7. The method of sterilizing a bed of granular activated carbon, which comprises passing through said bed an aqueous solution of iodine and an iodide, said solution being passed through the bed at a rate sufficiently rapid to insure the presence of free iodine in the effluent.

8. A method according to claim 3 in which the concentration of iodine is about 100 parts per million and of potassium iodide about 1000 parts per million.

9. A method according to claim 3 in which the volume of sterilizing solution employed is at least sufficient to fill the void spaces between the carbon granules.

10. A method for conditioning a water purification unit containing a bed of granular activated carbon which comprises backwashing the bed, then sterilizing with iodine, and subsequently washing to remove the excess sterilizing solution.

11. The process of sterilizing a bed of granular activated carbon, which comprises treating the carbon with a solution containing a compound of iodine, and treating said carbon with a substance which will liberate free iodine in the presence of the carbon.

12. In the sterilization of a bed of activated carbon, the steps which include passing through the carbon bed a solution containing iodine and a material which will retard the adsorption of the iodine by the carbon, said solution being passed through the carbon to an extent sufficient to provide for adsorption of iodine in all portions of the carbon bed.

13. The method of sterilizing a filter bed containing activated carbon, which comprises incorporating iodine in an aqueous solution, and passing the solution through the filter bed in contact with the carbon.

ABRAHAM SIDNEY BEHRMAN.